(12) United States Patent
Paulsen et al.

(10) Patent No.: US 8,076,622 B1
(45) Date of Patent: Dec. 13, 2011

(54) LOW PROFILE, CONFORMAL GLOBAL POSITIONING SYSTEM ARRAY FOR ARTILLERY

(75) Inventors: Lee M. Paulsen, Cedar Rapids, IA (US); Donald L. Michaels, Marion, IA (US); Robert J. Thompson, Cedar Rapids, IA (US); Michael J. Cook, Cedar Rapids, IA (US); John C. Mather, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 193 days.

(21) Appl. No.: 12/551,112

(22) Filed: Aug. 31, 2009

(51) Int. Cl.
*F42B 15/01* (2006.01)
*F42B 10/00* (2006.01)

(52) U.S. Cl. .......... 244/3.1; 343/700 R; 343/700 MS; 343/872; 102/382; 102/384; 102/473; 102/501; 701/200; 701/207; 701/213; 244/3.11; 244/3.14; 244/3.15; 244/3.19; 89/1.11

(58) Field of Classification Search .......... 343/872, 343/873, 700 MS, 700 R, 705, 711–717; 244/3.1–3.3; 89/1.11; 701/200, 207, 213; 342/61, 62, 13–20, 368; 102/382, 384, 473, 102/501
See application file for complete search history.

(56) References Cited

U.S. PATENT DOCUMENTS

| | | | | |
|---|---|---|---|---|
| 5,260,709 A * | 11/1993 | Nowakowski | .................. | 342/62 |
| 5,310,134 A * | 5/1994 | Hsu et al. | .................... | 244/3.12 |
| 5,344,105 A * | 9/1994 | Youhanaie | .................. | 244/3.14 |
| 5,507,452 A * | 4/1996 | Mayersak | .................... | 244/3.15 |
| 5,537,909 A * | 7/1996 | Schneider et al. | ............. | 89/1.11 |
| 5,554,994 A * | 9/1996 | Schneider | .................... | 244/3.19 |
| 5,657,947 A * | 8/1997 | Mayersak | .................... | 244/3.19 |
| 6,003,809 A * | 12/1999 | Honigsbaum | ................ | 244/3.15 |
| 6,037,899 A * | 3/2000 | Weber | .......................... | 701/213 |
| 6,069,584 A * | 5/2000 | Johnson | ........................ | 244/3.1 |
| 6,082,675 A * | 7/2000 | Woodall et al. | .............. | 244/3.23 |
| 6,157,875 A * | 12/2000 | Hedman et al. | ............. | 244/3.1 |
| 6,199,028 B1 * | 3/2001 | Repperger et al. | ............ | 244/3.1 |
| 6,237,496 B1 * | 5/2001 | Abbott | ......................... | 244/3.14 |
| 6,254,031 B1 * | 7/2001 | Mayersak | .................... | 244/3.22 |
| 6,317,688 B1 * | 11/2001 | Bruckner et al. | ............ | 701/213 |
| 6,564,146 B1 * | 5/2003 | Meyer et al. | .................. | 701/213 |
| 6,573,486 B1 * | 6/2003 | Ratkovic et al. | .............. | 244/3.2 |
| 6,654,685 B2 * | 11/2003 | McIntyre | ...................... | 701/213 |
| 6,666,401 B1 * | 12/2003 | Mardirossian | ............... | 244/3.11 |
| 6,779,752 B1 * | 8/2004 | Ratkovic | ...................... | 244/3.15 |
| 6,883,747 B2 * | 4/2005 | Ratkovic et al. | ............. | 244/3.15 |
| 7,076,342 B2 * | 7/2006 | Fukuda et al. | ............... | 244/3.15 |
| 7,105,790 B2 * | 9/2006 | Lamorlette | .................... | 244/3.2 |
| 7,121,502 B2 * | 10/2006 | Krikorian et al. | ............ | 244/3.14 |
| 7,350,744 B1 * | 4/2008 | Schwartz et al. | ............ | 244/3.15 |
| 7,409,292 B2 * | 8/2008 | Eckert et al. | ................. | 244/3.2 |
| 7,498,969 B1 * | 3/2009 | Paulsen et al. | .............. | 244/3.19 |
| 7,728,264 B2 * | 6/2010 | De Sa et al. | .................. | 244/3.15 |

* cited by examiner

*Primary Examiner* — Bernarr Gregory
(74) *Attorney, Agent, or Firm* — Donna P. Suchy; Daniel M. Barbieri

(57) ABSTRACT

The present invention is a device which includes an antenna and circuitry. The antenna may receive a circularly-polarized signal as first and second linearly-polarized signals. The circuitry is connected to the antenna and is configured for combining the first and second linearly-polarized signals to produce at least two reception patterns. The reception patterns are created by summing the first and second linearly-polarized signals via phase shifting. The reception patterns are optimized for at least two substantially different directional orientations. Further, the antenna may simultaneously allow/provide spec-compliant Global Positioning System operation and spec compliant Height of Burst operation.

20 Claims, 3 Drawing Sheets

LOW PROFILE, CONFORMAL GLOBAL POSITIONING SYSTEM ARRAY FOR ARTILLERY

FIELD OF THE INVENTION

The present invention relates to the field of Radio Frequency (RF) devices/advanced sensors and particularly to a low profile, conformal Global Positioning System (GPS) antenna array for artillery.

BACKGROUND OF THE INVENTION

A number of current RF device arrays may not provide a desired level of performance.

Thus, it would be desirable to provide an array/assembly which obviates the problems associated with current RF device arrays.

SUMMARY OF THE INVENTION

Accordingly, an embodiment of the present invention is directed to an assembly, including: a housing; a substrate, the substrate being connected to the housing to form a cavity; a plurality of chip antennas, the plurality of chip antennas being connected to the substrate and being at least substantially disposed within the cavity; circuitry, the circuitry being connected to the substrate, the circuitry further being connected to the plurality of antennas; and potting material, the potting material being disposed within the cavity and at least substantially filling the cavity, wherein the assembly is configured for implementation on-board a satellite navigation system-guided munition.

A further embodiment of the present invention is directed to an antenna assembly, including: a radome; a Radio Frequency flexible substrate, the substrate being connected to the housing to form a cavity; a plurality of chip antennas, the plurality of chip antennas being connected to the substrate and being at least substantially disposed within the cavity; circuitry, the circuitry being connected to the substrate, the circuitry further being connected to the plurality of antennas; and at least one Radio Frequency connector, the at least one Radio Frequency connector being connected to the substrate, the at least one Radio Frequency connector being connected, via the circuitry, to at least one chip antenna included in the plurality of chip antennas, wherein the antenna assembly is configured for implementation on-board a satellite navigation system-guided munition.

An additional embodiment of the present invention is directed to a side-mounted GPS patch antenna assembly for implementation on-board a GPS-guided munition, the assembly including: a radome, wherein the radome is formed of an injection-molded potting material; a Radio Frequency flexible substrate, the substrate being connected to the radome to form a cavity; a plurality of GPS-resonant chip antennas, the plurality of chip antennas being connected to the substrate and being at least substantially disposed within the cavity; circuitry, the circuitry being connected to the substrate, the circuitry further being connected to the plurality of antennas; and at least one Radio Frequency connector, the at least one Radio Frequency connector being connected to the substrate, the at least one Radio Frequency connector being connected, via the circuitry, to at least one chip antenna included in the plurality of chip antennas, wherein the cavity is at least substantially filled by the injection-molded potting material.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Side-mounted, gun-hard Global Positioning System (GPS) patch antennas may be implemented with/on-board GPS-guided artillery/munitions/artillery applications/artillery platforms. For example, when space is unavailable on/within the nose of an artillery shell for a Dielectric Resonator Antenna (DRA), such side-mounted patch antennas may provide a desirable/viable alternative to embedding an edge slot antenna within the artillery shell. Alternatively, even when a nose-mounted DRA is implemented with/within/on-board an artillery shell, it may be desirable to implement a side-mounted patch antenna array in addition to/in tandem with the nose-mounted DRA for providing Anti-Jamming (AJ) functionality for the artillery shell.

Figure 4B:
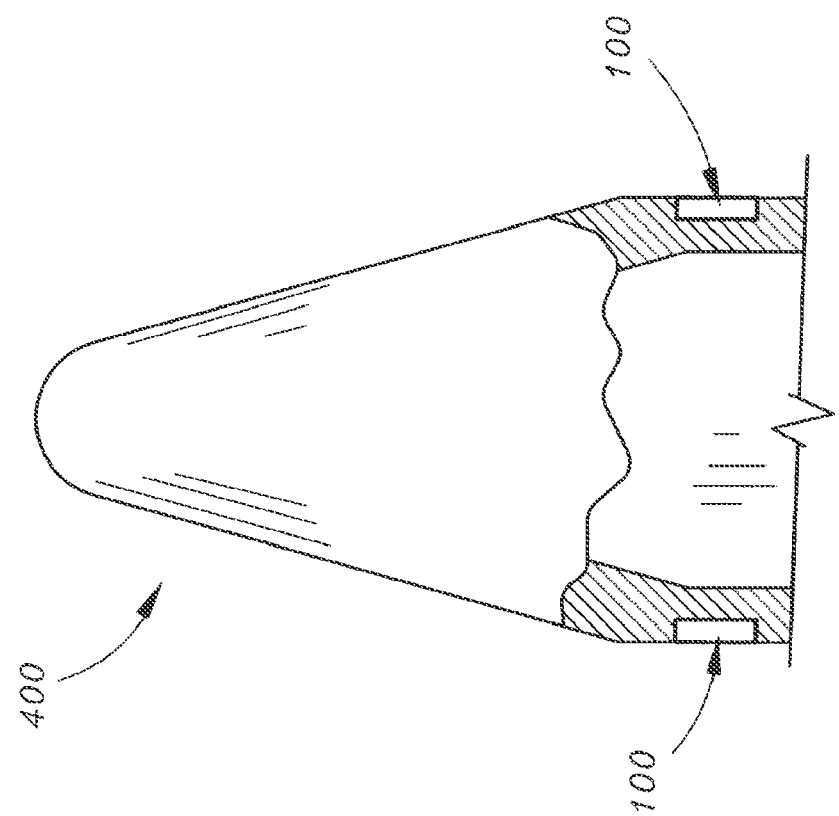
FIG. 4B is a cutaway view of an artillery shell having antenna assemblies implemented on-board said artillery shell, said antenna assemblies being in accordance with an exemplary embodiment of the present invention.
Figure 4A:
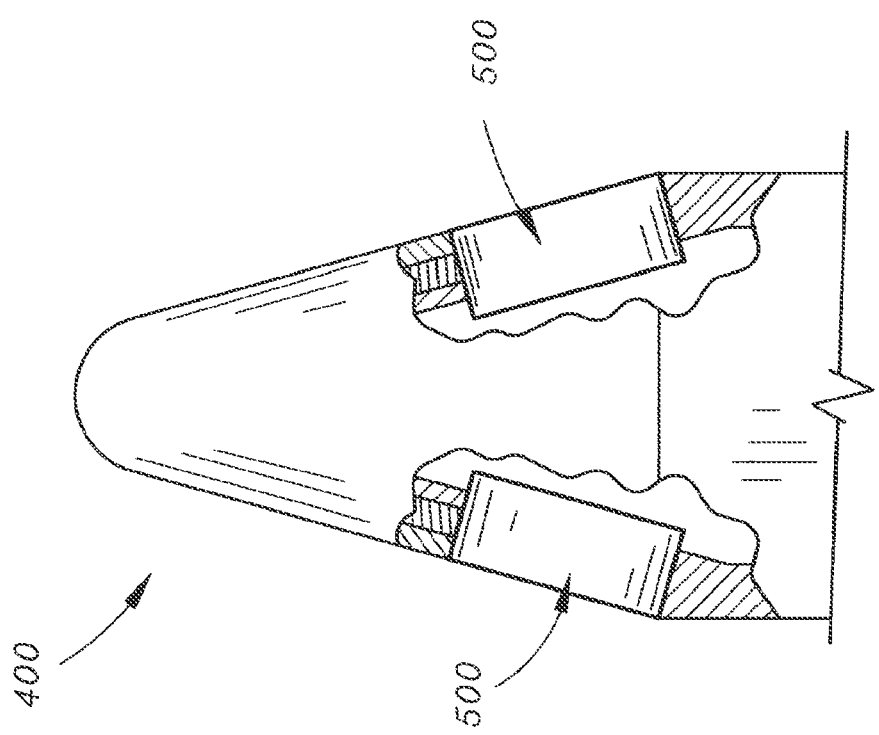
FIG. 4A is a cutaway view of an artillery shell having previously available antenna assemblies implemented on-board said artillery shell in accordance with a prior art embodiment.

However, currently available side-mounted, gun-hard GPS patch antennas are bulky. For example, currently available side-mounted, gun-hard GPS patch antennas/patches may include/may be configured inside of bulky housings (ex.—aluminum housings) in order to make the patches gun-hard. A further problem with currently available side-mounted, gun-hard GPS patch antennas 500 (see FIG. 4A) is that, when implemented on-board an artillery shell 400, they may extend at least 0.5 inches into the body of the artillery shell 400 (ex.—into the interior of the artillery shell volume), as shown in FIG. 4A. This extension/protrusion into the body/interior of the artillery shell may place costly constraints on currently available gun-hard receivers which are/may be implemented with GPS-guided artillery/munitions.

The exemplary embodiments of the present invention disclosed herein provide a low profile, conformal, gun-hard GPS antenna array/assembly which may be less expensive, lower profile (ex.—80% thinner and up to 50% shorter) and lighter weight than currently available solutions. Also, the exemplary embodiments of the present invention disclosed herein may provide low profile, conformal, gun-hard GPS antenna arrays/assemblies which are more versatile than currently available solutions (ex.—the arrays of the present invention may fit on several platforms upon which currently available solutions cannot). Further, the exemplary antenna array/assembly embodiments of the present invention described herein may promote increased compatibility with GPS receivers which may be implemented with GPS-guided artillery/munitions. Still further, the exemplary antenna array/assembly embodiments of the present invention described herein may provide supplemental AJ functionality on space-constrained platforms.

Figure 1A:
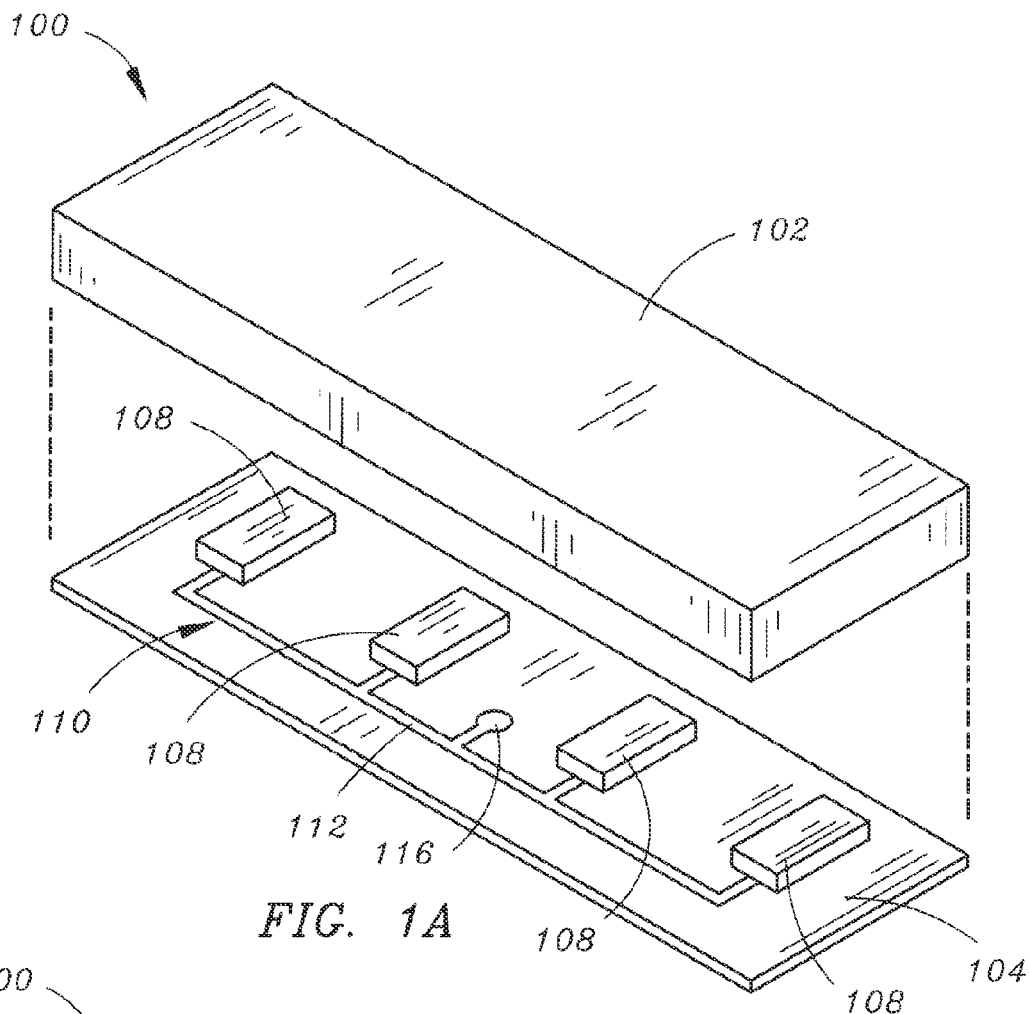
FIG. 1A is an isometric exploded view of an antenna assembly in accordance with an exemplary embodiment of the present invention.
Figure 1B:
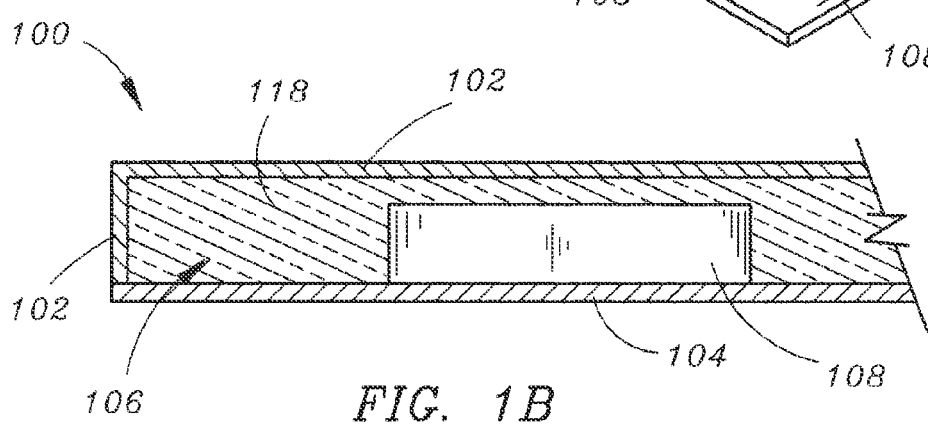
FIG. 1B is a cross-sectional view of the antenna assembly of FIG. 1A in accordance with an exemplary embodiment of the present invention.
Figure 3A:
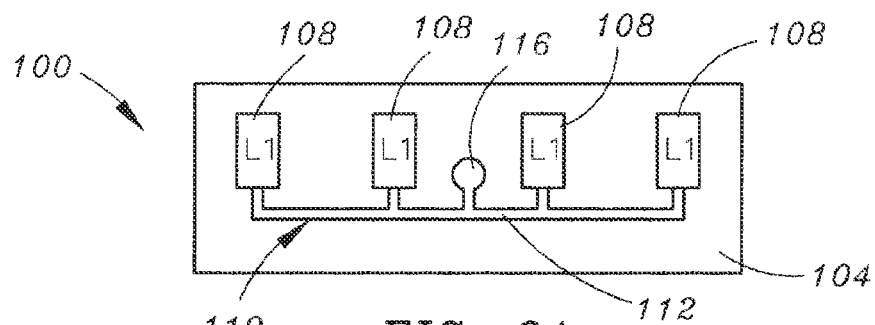
FIG. 3A is a top plan view of an antenna assembly (without the housing/radome being shown) in accordance with a further exemplary embodiment of the present invention.

Referring generally to FIGS. 1A, 1B and 3A, an assembly in accordance with exemplary embodiments of the present invention is shown. The assembly 100 may be an antenna assembly/antenna array 100 (ex.—a band antenna assembly 100) which may be configured for implementation within/on-board/with a satellite navigation system-guided munition. For instance, the antenna assembly 100 may be configured for implementation on-board a Global Positioning System (GPS)-guided munition (ex.—a GPS-guided artillery shell 400, as shown in FIG. 4B). In the embodiment illustrated in FIG. 4B, the antenna assemblies 100 are implemented on-board the GPS-guided munition 400 as a side-mounted GPS patch antenna assembly 100. The antenna assembly 100 may be configured for receiving satellite navigation system (ex.—GPS) signals for promoting/providing navigation functionality for the munition 400.

In exemplary embodiments of the present invention, the antenna assembly 100 may include a housing 102. For example, the housing 102 may be a radome 102, such as a thin-walled radome 102 for an artillery shell 400. The antenna assembly 100 may further include a substrate 104. The substrate 104 may be connected to the housing/radome 102 to form a cavity/enclosure 106. In current embodiments of the present invention, the substrate 104 may be a flexible substrate/Radio Frequency (RF) flexible substrate 104. For instance, the substrate 104 may be formed of flexible circuit board material 104.

Figure 2:
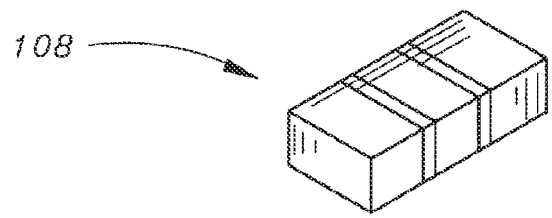
FIG. 2 is an isometric view of a chip antenna implemented in the antenna assembly shown in FIG. 1A and FIG. 1B in accordance with an exemplary embodiment of the present invention.

In further embodiments of the present invention, the antenna assembly 100 may include a plurality of chip antennas 108. In exemplary embodiments, the chip antennas 108 may be Commercial-Off-The-Shelf (COTS) chip antennas 108 (such as the chip antenna 108 shown in FIG. 2). For instance, the chip antennas 108 may be COTS radiators (ex.—chip antennas designed for cell phones) which may be very inexpensive. The chip antennas 108 may be connected to the substrate 104 and may be at least substantially disposed within the cavity 106 formed by the housing 102 and the substrate 104 (as shown in FIG. 1B). For example, the cavity 106 formed by the housing 102 and the substrate 104 may provide a protective enclosure for the chip antennas 108.

Figure 3B:
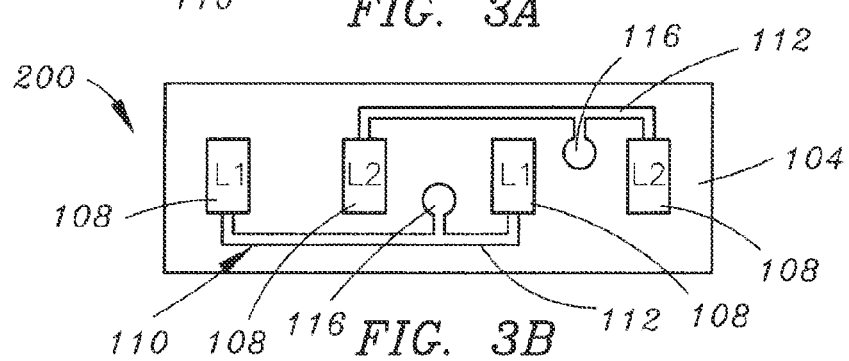
FIG. 3B is a top plan view of an antenna assembly (without the housing/radome being shown) in accordance with a first alternative exemplary embodiment of the present invention.
Figure 3C:
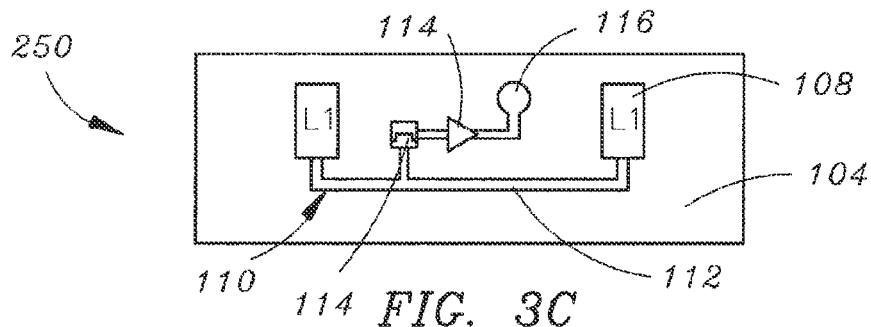
FIG. 3C is a top plan view of an antenna assembly (without the housing/radome being shown) in accordance with a second alternative exemplary embodiment of the present invention.

In exemplary embodiments of the present invention, the antenna assembly 100 may include circuitry 110. The circuitry 110 may be connected to the substrate 104 and may also be connected to the antennas 108. In further embodiments, the circuitry 110 may include one or more combiners 112 (ex.—a combiner network). For instance, each combiner 112 may be a coplanar waveguide (CPW) combiner 112. In still further embodiments, the circuitry 110 may include an active circuitry portion 114 (as shown in FIG. 3C).

In further embodiments, the antenna assembly 100 may include one or more RF connectors 116. Each RF connector 116 may be connected to the substrate 104 and may also be connected, via the circuitry 110, to one or more of the chip antennas 108.

In exemplary embodiments of the present invention, the antenna assembly 100 may include potting material 118. The potting material 118 may be disposed within the cavity 106 formed by the housing/radome 102 and the substrate/RF flexible substrate 104. For instance, the potting material 118 may at least substantially fill the cavity 106 (ex.—may fill the remaining unoccupied portion of the cavity/may fill the portion of the cavity not occupied by the antennas 108), thereby making the assembly 100 a gun-hard assembly 100.

In further embodiments, the chip antennas 108 of the assembly 100 are sized to allow the assembly 100 to provide a lower profile, lighter weight alternative to previously available patch antenna solutions and may occupy a much smaller footprint along the length of the artillery shell 400 (see FIG. 4B) then previously available patch antenna solutions (shown in FIG. 4A). For example, one or more of the chip antenna(s) 108 may occupy a footprint which measures 10 millimeters by 3.2 millimeters (10.0 mm×3.2 mm) on the substrate/flex circuit/flex circuit board 104 and may have a thickness which measures 2.0 millimeters (2.0 mm). The cavity 106 may be sized to accommodate the chip antennas 108. For instance, to accommodate/to allow sufficient clearance space for a chip antenna 108 having the above-referenced exemplary thickness dimension (ex.—2.0 mm), the cavity 106 may have a depth measurement/vertical axis depth measurement of 2.8 millimeters (2.8 mm) (as shown in FIG. 1B). In additional embodiments, the thickness/vertical axis depth measurement of the overall antenna assembly 100 may, for instance, be a measurement value ranging from 0.110 inches to 0.120 inches. In further embodiments, an exemplary footprint occupied by the substrate/flex circuit 104 may measure 180 millimeters by 15 millimeters (180 mm×15.0 mm). By being sized as described above, the antennas 108/antenna assembly 100 of the exemplary embodiments of the present invention may be much thinner (ex.—80% thinner) and much shorter (ex.—50% shorter) than currently available antennas/antenna assemblies, thereby allowing the antenna assembly 100 of the exemplary embodiments of the present invention to fit on several platforms where existing gun-hard side mounted patch antennas/patches will not.

In the exemplary embodiment of the antenna assembly 100 shown in FIGS. 1A, 1B and 3A, four chip antennas 108 may be implemented, each of the four chip antennas 108 being L1 GPS-resonant chip antennas 108 (shown as L1 in FIG. 3A). Further, the embodiment of the antenna assembly 100 shown in FIGS. 1A, 1B and 3A implements a single combiner 112 connected to the four chip antennas 108, and further implements a single RF connector 116 connected to the combiner 112 and the four chip antennas 108. However, the antenna assembly 100 may be configured in/reconfigured into/ adapted into a variety of alternative embodiments, as shown in FIGS. 3B, 3C, 3D and 3E, thereby promoting ease of applying a consistent/flexible antenna design across multiple artillery platforms. For instance, an antenna assembly 200 in accordance with a first alternative exemplary embodiment of the present invention (as shown in FIG. 3B) may implement four chip antennas 108. However, two of the four chip antennas 108 may be L2 GPS-resonant chip antennas (shown as L2 in FIG. 3B), while the remaining two of the four chip antennas 108 are L1 GPS-resonant chip antennas (shown as L1 in FIG. 3B). Further, the assembly 200 of FIG. 3B may implement two combiners 112, a first combiner of said two combiners 112 connecting the L1 GPS-resonant chip antennas 108, a second of said two combiners connecting the L2 GPS-resonant chip antennas 108. The assembly 200 further implements two RF connectors 116, a first RF connector of said two RF connectors 116 being connected to the L1 GPS-resonant chip antennas via the first combiner 112, a second RF connector of said two RF connectors 116 being connected to the L2 GPS-resonant chip antennas via the second combiner 112.

Figure 3D:
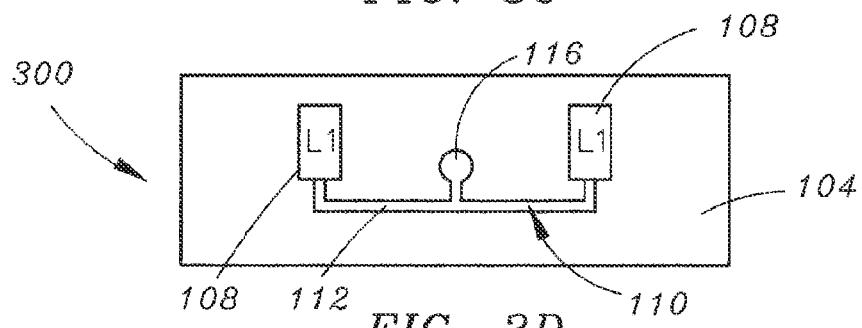
FIG. 3D is a top plan view of an antenna assembly (without the housing/radome being shown) in accordance with a third alternative exemplary embodiment of the present invention.
Figure 3E:
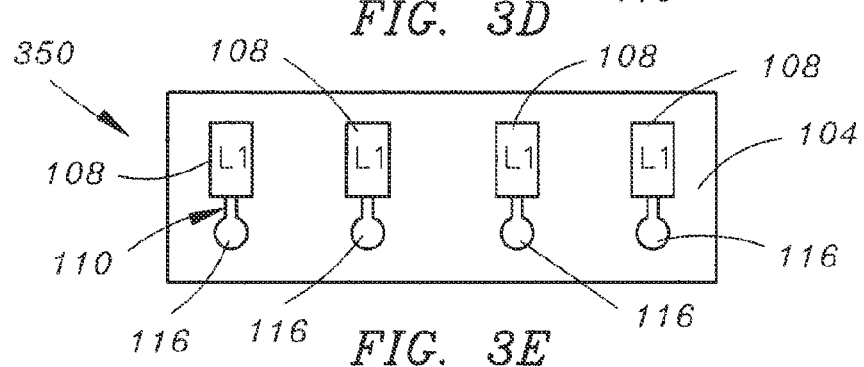
FIG. 3E is a top plan view of an antenna assembly (without the housing/radome being shown) in accordance with a fourth alternative exemplary embodiment of the present invention.

An antenna assembly 250 in accordance with a further alternative exemplary embodiment of the present invention (as shown in FIG. 3C) may implement two chip antennas 108 (ex.—two L1 GPS-resonant chip antennas), one combiner 112 connected to the antennas 108, and an RF connector 116 connected to the antennas 108 via the combiner 112. Further, an active circuitry portion 114 may be connected between the combiner 112 and the RF connector 116. An antenna assembly 300 in accordance with a further alternative exemplary embodiment of the present invention (as shown in FIG. 3D) may implement two chip antennas 108 (ex.—two L1 GPS-resonant chip antennas), one combiner 112 connected to the antennas 108, and an RF connector 116 connected to the antennas 108 via the combiner 112. An antenna assembly 350 in accordance with a further alternative exemplary embodiment of the present invention (as shown in FIG. 3E) may implement four chip antennas 108 (ex.—four L1 GPS-resonant chip antennas) and four RF connectors 116, each RF connector being connected to the chip antennas 108 in a dedicated manner (ex.—a first chip antenna included in the four chip antennas being connected to a first RF connector included in the four RF connectors, a second chip antenna included in the four chip antennas being connected to a second RF connector included in the four RF connectors, etc.).

The above-referenced exemplary embodiments of the antenna assembly (100, 200, 250, 300, 350) illustrate the flexibility of the antenna assembly of the present invention and how it may be configured/adapted to provide any one of various multiple antenna offerings in a single footprint. This flexibility may allow for accommodation of many different programs via a single form factor with short turnaround times when a new requirement arises. Further, such flexibility, and the above-referenced low profile characteristics of the antenna assembly 100 of the exemplary embodiments of the present invention may promote improved (ex.—universal) compatibility with various GPS electronics (ex. GPS receivers) and Inertial guidance electronics.

In further exemplary embodiments, the antenna assembly 100/chip antennas 108 may be configured for being switched. For example, if the antenna assembly 100 is implemented on-board a GPS-guided munition, the antenna assembly/array 100 may be switched from/may transition from a first operating mode (ex.—Mode 1) to a second operating mode (ex.—Mode 0) when the GPS-guided munition is in mid-flight.

In additional embodiments, the antenna assembly 100/chip antennas 108 may provide similar gain characteristics as linearly-polarized edge slot antennas. Further, the antenna assembly 100 may work well as a secondary antenna assembly in an Anti-Jamming (AJ) system, said AJ system implementing a nose-mounted Dielectric Resonator Antenna (DRA) as the primary signal reference. For instance, the antenna assembly 100 may provide additional/supplemental anti-jamming capability on space-constrained platforms.

In further embodiments, the potting material 118 may be injection-molded potting material for filling/partially filling/at least substantially filling the cavity 106. In still further embodiments, the radome 102 may be formed of the injection-molded potting material.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An assembly, comprising:
a housing;
a substrate, the substrate being connected to the housing to form a cavity;
a plurality of chip antennas, the plurality of chip antennas being connected to the substrate and being at least substantially disposed within the cavity;
circuitry, the circuitry being connected to the substrate, the circuitry further being connected to the plurality of antennas; and
potting material, the potting material being disposed within the cavity and at least substantially filling the cavity,
wherein the assembly is configured for implementation on-board a satellite navigation system-guided munition.

2. An assembly as claimed in claim 1, further comprising:
at least one Radio Frequency connector, the at least one Radio Frequency connector being connected to the substrate, the at least one Radio Frequency connector being connected, via the circuitry, to at least one chip antenna included in the plurality of chip antennas.

3. An assembly as claimed in claim 1, wherein the circuitry includes a combiner.

4. An assembly as claimed in claim 1, wherein the circuitry includes an active circuitry portion.

5. An assembly as claimed in claim 1, wherein the plurality of chip antennas includes at least one L1 GPS-resonant antenna.

6. An assembly as claimed in claim 1, wherein the plurality of chip antennas includes at least one L2 GPS-resonant antenna.

7. An assembly as claimed in claim 1, wherein the plurality of chip antennas are Commercial-Off-The-Shelf chip antennas.

8. An assembly as claimed in claim 1, wherein the substrate is a Radio Frequency flexible substrate.

9. An assembly as claimed in claim 1, wherein the housing is a radome.

10. An assembly as claimed in claim 1, wherein the assembly is gun-hard.

11. An assembly as claimed in claim 1, wherein the assembly is implemented on-board a GPS-guided munition.

12. An assembly as claimed in claim 11, wherein the assembly is a side-mounted GPS patch antenna assembly.

13. An assembly as claimed in claim 12, wherein the plurality of chip antennas are configured for being switched between a first operating mode and a second operating mode when the GPS-guided munition is in flight.

14. An assembly as claimed in claim 12, wherein the assembly is configured for being implemented in combination with a nose-mounted dielectric resonator antenna assembly as part of an anti-jamming system.

15. An antenna assembly, comprising:
a radome;
a Radio Frequency flexible substrate, the substrate being connected to the housing to form a cavity;
a plurality of chip antennas, the plurality of chip antennas being connected to the substrate and being at least substantially disposed within the cavity;
circuitry, the circuitry being connected to the substrate, the circuitry further being connected to the plurality of antennas; and
at least one Radio Frequency connector, the at least one Radio Frequency connector being connected to the substrate, the at least one Radio Frequency connector being connected, via the circuitry, to at least one chip antenna included in the plurality of chip antennas,
wherein the antenna assembly is configured for implementation on-board a satellite navigation system-guided munition.

16. An antenna assembly as claimed in claim 15, wherein the radome is formed of an injection-molded potting material.

17. An antenna assembly as claimed in claim 16, wherein the cavity is at least substantially filled by the injection-molded potting material.

18. An antenna assembly as claimed in claim 15, wherein the circuitry includes at least one of: a combiner and an active circuitry portion.

19. An antenna assembly as claimed in claim 15, wherein the antenna assembly is implemented on-board a GPS-guided munition.

20. A side-mounted GPS patch antenna assembly for implementation on-board a GPS-guided munition, the assembly comprising:
a radome, wherein the radome is formed of an injection-molded potting material;
a Radio Frequency flexible substrate, the substrate being connected to the radome to form a cavity;
a plurality of GPS-resonant chip antennas, the plurality of chip antennas being connected to the substrate and being at least substantially disposed within the cavity;
circuitry, the circuitry being connected to the substrate, the circuitry further being connected to the plurality of antennas, the circuitry including at least one of a combiner and an active circuitry portion; and
at least one Radio Frequency connector, the at least one Radio Frequency connector being connected to the substrate, the at least one Radio Frequency connector being connected, via the circuitry, to at least one chip antenna included in the plurality of chip antennas,
wherein the cavity is at least substantially filled by the injection-molded potting material.

* * * * *